United States Patent
R et al.

(10) Patent No.: US 11,416,233 B1
(45) Date of Patent: Aug. 16, 2022

(54) SOFTWARE UPGRADE SYSTEM AND METHOD FOR A BASEBOARD MANAGEMENT CONTROLLER CONFIGURED IN AN INFORMATION HANDLING SYSTEM

(71) Applicant: Dell Products, L.P., Round Rock, TX (US)

(72) Inventors: Chandrasekhar R, Bangalore (IN); Raveendra Babu Madala, Bangalore (IN); Bala Balaji Gupta M, Bangalore (IN); Sathish Kumar Ponnusamy, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/236,048

(22) Filed: Apr. 21, 2021

(51) Int. Cl.
*G06F 8/61* (2018.01)
*G06F 7/58* (2006.01)
*G06F 8/65* (2018.01)

(52) U.S. Cl.
CPC .............. *G06F 8/63* (2013.01); *G06F 7/588* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 7,849,454 | B2 * | 12/2010 | Lambert | G06F 11/0793 717/168 |
| 8,428,929 | B2 * | 4/2013 | Sakthikumar | G06F 21/572 703/23 |
| 9,043,777 | B2 * | 5/2015 | Guo | G06F 8/65 717/168 |
| 10,146,551 | B2 * | 12/2018 | Miller | G06F 8/65 |
| 2021/0141626 | A1 * | 5/2021 | Ladkani | G06F 3/0655 |

* cited by examiner

*Primary Examiner* — Marina Lee
(74) *Attorney, Agent, or Firm* — Fogarty LLP

(57) ABSTRACT

Embodiments of systems and methods for verification of software packages prior to deployment on an Information Handling System (IHS) are described. In an illustrative, non-limiting embodiment, an IHS may include a Baseboard Management Controller (BMC) having computer-executable instructions for creating a partition having a unique name in response to a request from the IHS. The BMC then transmits the unique name to the IHS, and exposes the created partition to the IHS in which a software upgrade package image is copied to the partition when the exposed partition becomes available to the IHS. The BMC may then deploy the software package on the BMC, wherein the software package comprises executable instructions for operating the BMC.

20 Claims, 4 Drawing Sheets

SOFTWARE UPGRADE SYSTEM AND METHOD FOR A BASEBOARD MANAGEMENT CONTROLLER CONFIGURED IN AN INFORMATION HANDLING SYSTEM

FIELD

The present disclosure relates generally to Information Handling Systems (IHSs), and more particularly, to a software upgrade System and method for a baseboard management controller (BMC) configured in an information handling system (IHS).

BACKGROUND

Communication networks, and in particular the Internet, has revolutionized the manner in which software is updated on a computer system. Prior to the advent of the Internet, a software provider would package the update on computer readable media, and the computer owner had to obtain a copy of the media to complete the update in order to make the software update accessible to the user of the computer system. However, distributing software updates on computer readable media was often expensive for software providers, which tended to restrict the number of software updates that a software provider would issue. As a consequence, substantial time would pass between updates, and consumers had to manage certain known issues for these time periods, at least until an update became available. Another aspect of this older method was that many modifications were packaged into a single update to reduce the costs associated with distributing the update.

Nowadays, software updates are typically made available on one or more download sites just as soon as the software provider can produce them. In this manner, software providers can be more responsive to critical flaws, security concerns, and general customer needs. As a result, to update software, a customer would query an update site for software updates, and download and install the software update if available. For example, a typical network-based software update procedure may includes the steps of issuing a request over a network to a software provider's download site (e.g., update source), for a software update applicable to the client computer. The update source responds to the client computer with the software update requested by the client computer in the update request. After the client computer has received the software update, the client computer installs the received software update.

One benefit of updating software in such a manner is the reduced cost associated with producing and distributing software updates. Additionally, software updates can now be performed more frequently, especially those that address critical issues and security. Still further, a computer user has greater control as to when and which software updates should be installed on the client computer.

Nevertheless, many currently available IHSs also include hardware components, such as baseboard management controllers (BMCs) that utilize upgradable firmware instructions commonly packaged as software package updates. In modern day IHSs, administrative management is often provided via baseboard management controllers (BMCs). The baseboard management controller (BMC) generally includes a specialized microcontroller embedded on the motherboard of the IHS, and provides an interface between system-management software and platform hardware.

The software package of a BMC may be stored in a non-volatile memory that is integral to that BMC. In various scenarios, firmware utilized by the BMC may be updated, on occasion, to correct errors and/or improve its performance. Networked environments, such as described above, allow the firmware to be updated remotely. An IHS administrator or an automated script may push firmware update packages to the IHS's hardware component to initiate a firmware update operation.

A firmware package creation service, application, or tool may be provided for users and administrators to create software update packages. Typically, the user uploads a software package image, metadata, and/or payload inventory and execution (PIE) information to form a management update package (MUP) using a software package creation service. The MUP is often packaged as a single file that self-extracts and includes executable instructions for deploying the software package on the hardware component. As the inventors hereof have recognized, upgrading software packages in BMCs can be problematic, particularly due to the manner in which traditional implementations of the MUP deliver and install (e.g., deploy) the software package on the BMC. It is with these concerns in mind, among others, that embodiments of the present disclosure have been developed.

SUMMARY

Embodiments of systems and methods for verification of software packages prior to deployment on an Information Handling System (IHS) are described. In an illustrative, non-limiting embodiment, an IHS may include a Baseboard Management Controller (BMC) having computer-executable instructions for creating a partition having a unique name in response to a request from the IHS. The BMC then transmits the unique name to the IHS, and exposes the created partition to the IHS in which a software upgrade package image is copied to the partition when the when the exposed partition becomes available to the IHS. The BMC may then deploy the software package on the BMC, wherein the software package comprises executable instructions for operating the BMC.

According to another embodiment, a method includes the steps of creating, using a Board Management Controller (BMC), a partition having a unique name in response to a request from an IHS. The method further includes the steps of transmitting the unique name to the IHS, and exposing the created partition to the IHS in which a software upgrade package image is copied to the partition when the exposed partition becomes available to the IHS. The steps also include deploying the software package on the BMC, wherein the software package comprises executable instructions for operating the BMC.

According to yet another embodiment, an IHS includes executable instructions for transmitting a request to generate a unique name to a Baseboard Management Controller (BMC). The instructions then receive the unique name from the BMC and using the received unique name, transmit a request to create a partition with the unique name. When the partition becomes available, the instructions copy a software upgrade package image to the partition, and un-expose the partition after the software upgrade package is copied.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
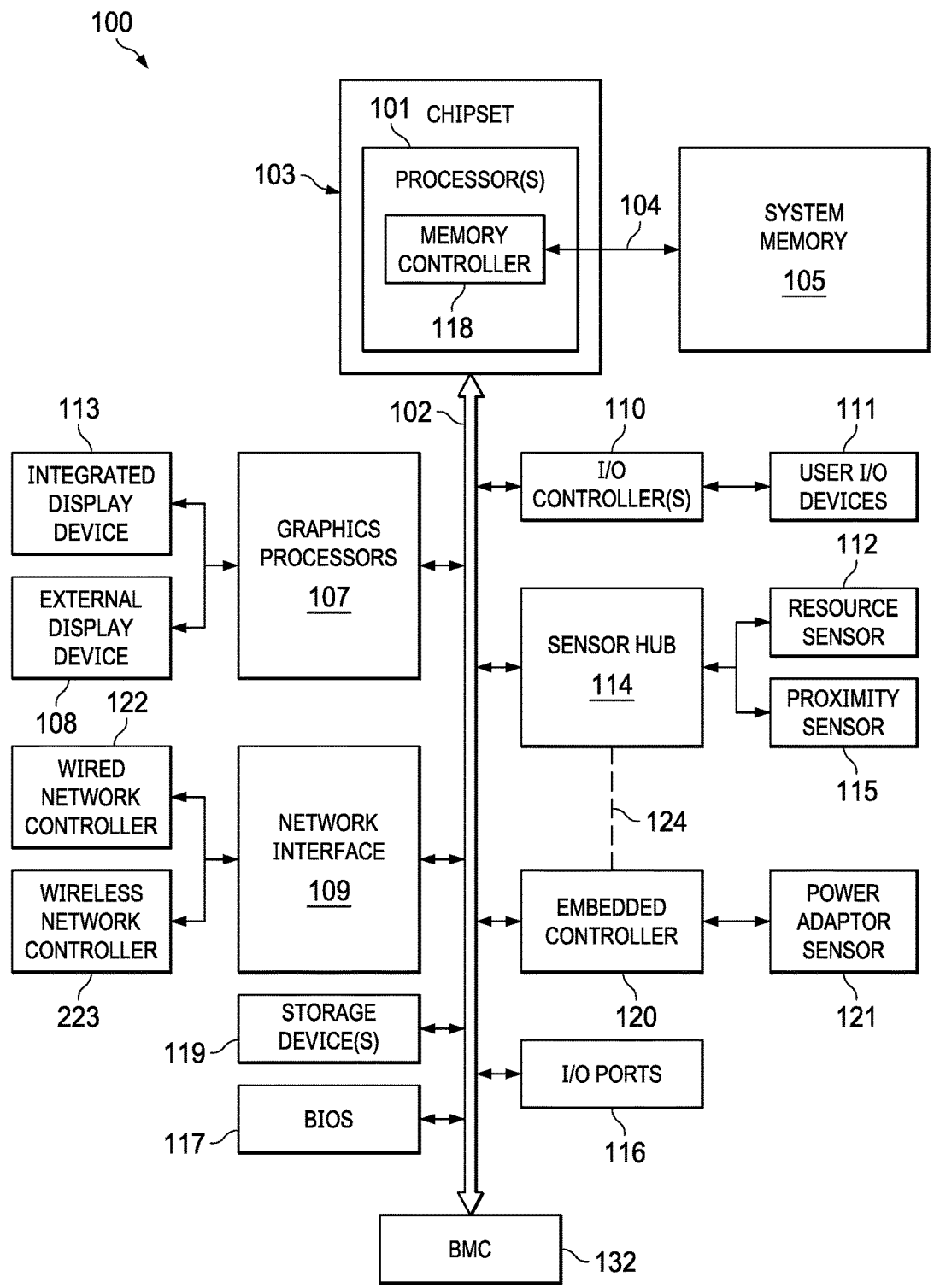
FIG. 1 is a block diagram illustrating components of IHS configured to manage performance optimization of applications according to one embodiment of the present disclosure.

Embodiments of the present disclosure provide a software package upgrading system and method for a baseboard management controller (BMC) configured in an information handling system (IHS). The system and method provide a technique for reliably and securely transferring a software package image to the BMC for its deployment (e.g., installation) on the BMC. In some embodiments, the software package upgrading system and method involves the use of a logical memory partition to transfer the software package image to the BMC in a manner such that reduces risk of illicit tampering with the software package image. Additionally, a technique for un-exposing the logical memory partition is provided so that, in the event that the logical memory partition does not properly detach from the operating system of the host IHS following the software package upgrade procedure, the partition can still be un-exposed to reduce the risk of illicit tampering with the newly installed software package.

To address and fix certain issues and/or for enhancing functionality of IHSs, software package updates are provided from time to time. In many cases, software package updates may be provided by an online support portal, which is made available to customers by the IHS provider.

For example, the DELL CORPORATION, which is headquartered in Round Rock, Tex., has an online support portal for distributing software packages that are packaged as Dell Update Packages (DUPs) (e.g., a particular type of Management Update package (MUP)). These MUPs encapsulate software package updates along with certain support data and scripts, such as software package metadata, applicability checking features, dependency checking features, and the like.

In some cases, the MUPs are packaged into a single file that self-extracts from an archive file format (e.g., zip file), and applies (installs) the software package update when downloaded and executed in an operating system. The BMC, which includes its own computing environment, may also be upgraded with new software package's from time to time. In this case, the MUP transfers the software package to the BMC, and BMC applies the software package update. The process of transferring the update to BMC may be referred to as BMC staging or simply staging. The BMC usually exposes a portion of its memory as a partition in the operating system (OS) of the host IHS. Conventional techniques for BMC staging have involved the use of hardcoded names for the exposed partition. For example, and iDRAC BMC, provided by the DELL CORPORATION, exposes a MASER partition with a hardcoded name of "SECUPD." In such a case, the MUP copies the software package update to SECUPD partition. While it is expected that the MUP should detach or un-expose the SECUPD partition, this does not always occur. Moreover, though the software package updates have been successful, the partition is not detached properly. This condition often yields several problems. For example, subsequent software package update procedures may fail to create a session for staging updates to BMC. As another example, the improperly exposed (hung) partition yields a vulnerable situation in which a rogue process executed on the host IHS can copy unwarranted contents to or from the partition.

As will be described in detail herein below, embodiments of the present disclosure provide a solution to these problems, among others, using a technique for reliably and securely transferring a software package image to the BMC for its deployment (e.g., installation) on the BMC, and un-exposing the logical memory partition in the event that the logical memory partition does not properly detach from the operating system of the host IHS following the software package upgrade procedure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 1 is a block diagram illustrating components of IHS 100 configured to manage performance optimization of applications according to one embodiment of the present disclosure. As shown, IHS 100 includes one or more processors 101, such as a Central Processing Unit (CPU), that execute code retrieved from system memory 105. Although IHS 100 is illustrated with a single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 may include multiple removable memory modules.

IHS 100 utilizes chipset 103 that may include one or more integrated circuits that are connected to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removable couplings with various types of external devices and systems, including removable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 111 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to the processor(s) 101 of the IHS 100 through the chipset 103. For instance, chipset 103 may be coupled to network interface 109 that may support different types of network connectivity. IHS 100 may also include one or more Network Interface Controllers (NICs) 122 and 223, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and 113, coupled to IHS 100.

One or more display devices 108 and 113 coupled to IHS 100 may utilize LCD, LED, OLED, or other display technologies. Each display device 108 and 113 may be capable of receiving touch inputs such as via a touch controller that may be an embedded component of the display device 108 and 113 or graphics processor 107, or it may be a separate component of IHS 100 accessed via bus 102. In some cases, power to graphics processor 107, integrated display device 113 and/or external display 108 may be turned off, or configured to operate at minimal power levels, in response to IHS 100 entering a low-power state (e.g., standby).

As illustrated, IHS 100 may support an integrated display device 113, such as a display integrated into a laptop, tablet, 2-in-1 convertible device, or mobile device. IHS 100 may also support use of one or more external displays 108, such as external monitors that may be coupled to IHS 100 via various types of couplings, such as by connecting a cable from the external display 108 to external I/O port 116 of the IHS 100. In certain scenarios, the operation of integrated displays 113 and external displays 108 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 capable of sampling and/or collecting data from a variety of sensors. For instance, sensor hub 114 may utilize hardware resource sensor(s) 112, which may include electrical current or voltage sensors, and that are capable of determining the power consumption of various components (e.g., resources) of IHS 100 (e.g., CPU 101, GPU 107, system memory 105, network resources (e.g., network interface 107, wired network controller 122, wireless network controller 123), platform resources (e.g., power supplies, cooling systems, batteries) etc.). In certain embodiments, sensor hub 114 may also include capabilities for determining a location and movement of IHS 100 based on triangulation of network signal information and/or based on information accessible via the OS or a location subsystem, such as a GPS module.

In some embodiments, sensor hub 114 may support proximity sensor(s) 115, including optical, infrared, and/or sonar sensors, which may be configured to provide an indication of a user's presence near IHS 100, absence from IHS 100, and/or distance from IHS 100 (e.g., near-field, mid-field, or far-field).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit (I$^2$C) bus or other suitable type of bus connection. Sensor hub 114 may also utilize an I$^2$C bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions.

EC 120 may also implement operations for interfacing with power adapter sensor 121 in managing power for IHS 100. These operations may be utilized to determine the power status of IHS 100, such as whether IHS 100 is operating from battery power or is plugged into an AC power source (e.g., whether the IHS is operating in AC-only mode, DC-only mode, or AC+DC mode). In some embodiments, EC 120 and sensor hub 114 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

According to certain embodiments of the present disclosure, the IHS 100 may be configured with a baseboard management controller (BMC) 132. In general, BMC 132 enables remote operation control of various components (e.g., I/O controller 110, storage devices 119, I/O ports 116, sensor hub 114, EC 120, etc.) configured in the IHS 100. Moreover, BMC 132 may be configured to provide out-of-band management facilities for IHS 100. Management operations may be performed by BMC 132 even if the IHS 100 is powered off, or powered down to a standby state.

BMC 132 may include a processor, memory, and an out-of-band network interface separate from and physically isolated from an in-band network interface of IHS 100, and/or other embedded resources in the IHS 100. In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
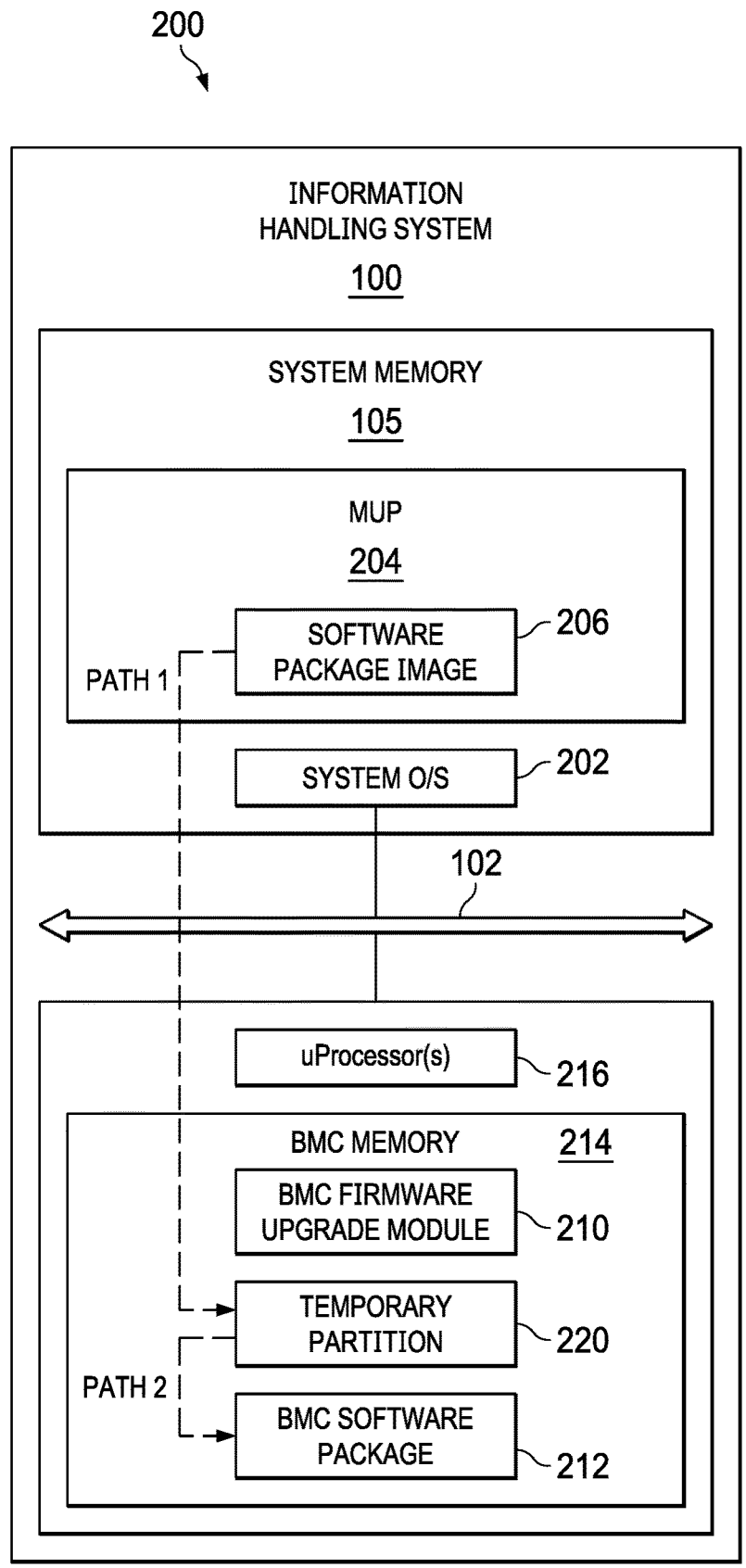
FIG. 2 illustrates several components of the IHS and the BMC that may be used to implement the software upgrade system and method according to one embodiment of the present disclosure.

FIG. 2 illustrates several components of the IHS 100 and the BMC 132 that may be used to implement the software upgrade system and method according to one embodiment of the present disclosure. The IHS 100 includes a host operating system (OS) 202 (e.g., WINDOWS, MACOS, iOS, ANDROID, LINUX, etc.) that is stored in the system memory 105 of the IHS 100, and supports execution of a MUP 204. In general, the MUP 204 includes a software package image 206 along with certain support data, such as one or more executable scripts for deploying the software package image 206 on the BMC 132. In some cases, the MUP 204 packages the software package image 206 and support data are packaged into a single file that self-extracts from an archive file format (e.g., zip file) when downloaded, and applies (installs) the software package update on the BMC 132. The MUP 204 may be obtained from any suitable source. For example, the MUP 204 may be obtained from an online support portal provided by the IHS provider.

The BMC 132 includes a BMC firmware upgrade module 210 and a BMC software package 212 that are stored in a BMC memory 214 (e.g., computer readable media) and executed by one or more processors 216. The BMC software package 212 is executed by the processors 216 to perform the various features of the BMC 132, such as those described above.

The BMC memory 214 may include volatile media, nonvolatile media, removable media, non-removable media, and/or another available medium. By way of example and not limitation, BMC memory 214 comprises computer storage media, such as non-transient storage memory, volatile media, nonvolatile media, removable media (e.g., SD card), and/or non-removable media implemented in a method or technology for storage of information, such as computer readable instructions, data structures, program modules, or other data.

In general, when a new software package image 206 is to be deployed on the BMC 132, the BMC firmware upgrade module 210 creates a temporary partition 220, which is mounted on and exposed to the system OS 202 of the IHS 100 vi the system bus 102. Using this mounted partition 220, an executable script included in the MUP 204 is executed to copy the software package image 206 to the partition 220 via path 1. Next, the BMC firmware upgrade module 210 deploys or installs the software package image 206 as the new software package 212 on the BMC 132, which is denoted as path 2. Additional details of how the software package image 206 is downloaded and installed on the BMC 132 will be described in detail herein below.

Figure 3:
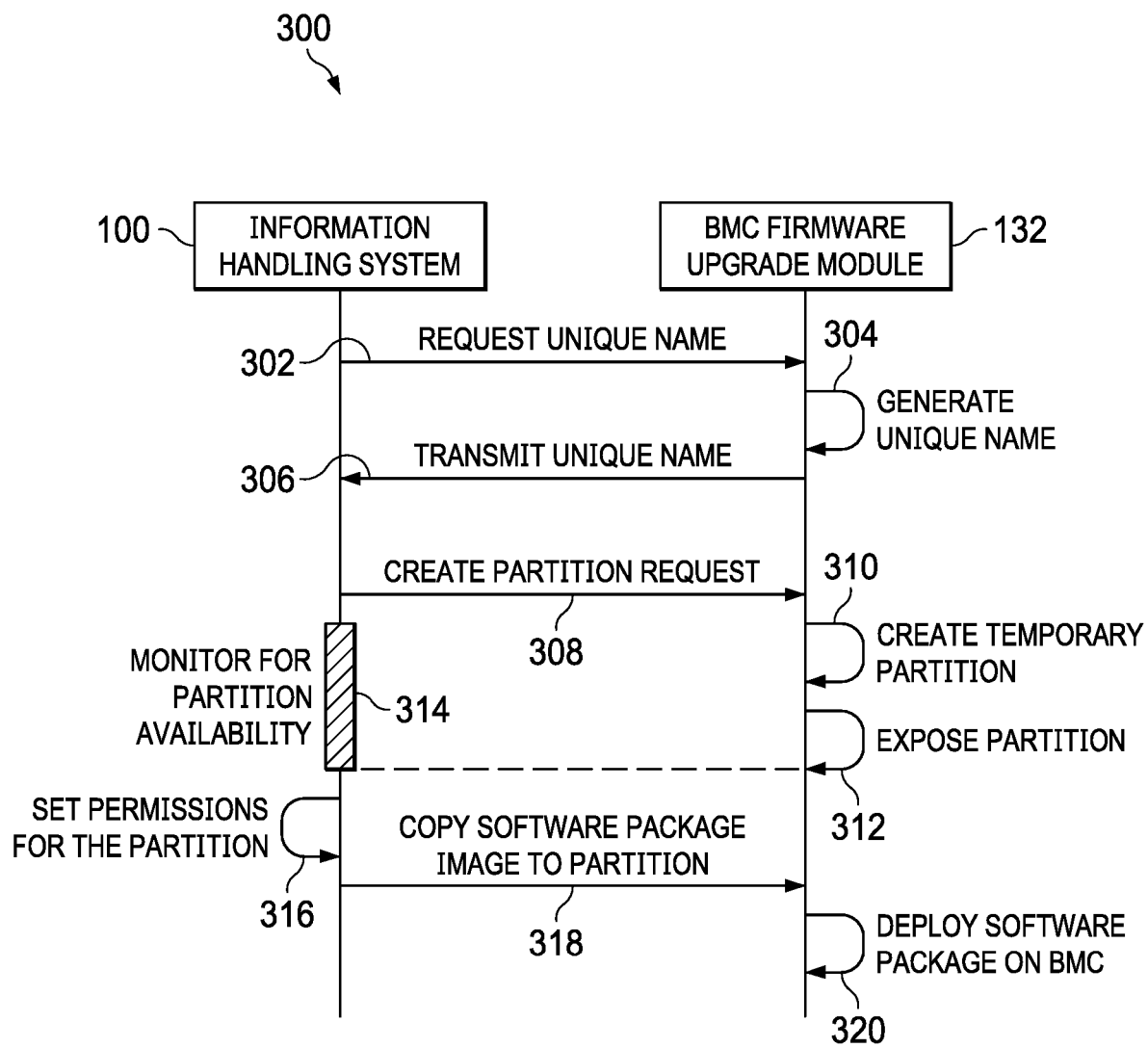
FIG. 3 illustrates a software package upgrade method depicting how a software package image may be installed or deployed on the BMC according to one embodiment of the present disclosure.

FIG. 3 illustrates a software package upgrade method 300 depicting how a software package image 206 may be installed or deployed on the BMC 132 according to one embodiment of the present disclosure. In one embodiment, the software package upgrade method 300 may be performed in whole, or in part, by BMC firmware upgrade module 210 and IHS 100 described herein above. In one embodiment, certain steps of the IHS 100 described herein may be performed using instructions included in the MUP 204. Initially, a MUP 204 including a new software package image 206 is stored in the system memory 105 of the IHS 100. In one embodiment, the MUP 204 is downloaded from an online portal, such as described herein above. In another embodiment, the OS 202 of the IHS 100 may be configured to automatically extract the files included in the MUP 204, and execute one or more scripts extracted from the MUP 204 to perform the various steps of the IHS 100 described herein below.

At step 302, the IHS 100 transmits a request to the BMC firmware upgrade module 210 to generate a unique partition name. The IHS 100 may use any suitable trigger for initiating the request, such as directly after being stored on the system memory 105 of the IHS 100. In response, the BMC firmware upgrade module 210 generate a unique name for the yet to be created partition 220 at step 304. In one embodiment, the BMC firmware upgrade module 210 may generate a new unique name each time the method 300 is performed so that illicit processes may be inhibited from tracking when and how the method 300 performs its task of upgrading the software package of the BMC 132. In another embodiment, the BMC firmware upgrade module 210 may generate the unique name using a random number generator, such as one that derives random numbers at least in part using a real-time clock. In yet another embodiment, the BMC firmware upgrade module 210 may generate the unique name that is allocated with a specified number of characters. Thereafter, the BMC firmware upgrade module 210 transmits the unique name to the IHS 100 at step 306. In yet another embodiment, the BMC firmware upgrade module 210 may access a table or other storage medium to alternatively select a unique name from among a list of potential unique names such that each of the potential unique names may be selected in a rotating fashion as the method 300 is repeatedly performed multiple times. Such a technique may be beneficial in cases where the resources (e.g., processing and memory resources) of the BMC 132 may be limited.

At step 308, the IHS 100 transmits a request to create a partition 220 with the specified unique name. In response, the BMC firmware upgrade module 210 creates the temporary partition 220 with the unique name at step 310, and exposes it to the system OS 202 at step 312. For example, if the system OS 202 is a UNIX-based OS (e.g., UNIX, LINUX, BSD, etc.), it may issue command sequence, such as "fdisk 'unique name'", followed by "mount 'unique name'", subsequently followed by "chmod 777 'unique name'" to expose the partition to the system OS 202.

At step 314, the IHS 100 monitors system OS 202 for the availability of the partition 220. In one embodiment, step 314 is performed concurrently with steps 310 and 312. That is, step 314 may be performed by the IHS 100 directly after it has issued the request to create the partition 220 at step 308. In other embodiments, step 314 may be performed at any suitable time to monitor for the availability of the partition 220 on the system OS 202.

When the partition 220 becomes available to the system OS 202, the IHS 100 sets the permissions for the partition 220 such that only it has write permissions to the partition 220 at step 316. For example, the IHS 100 may set read and write permissions for itself, while setting only read permissions for every other account on the system OS 202. If the system OS 202 is a UN IX-based system, for example, the IHS 100 may issue the following command "chmod 700 'unique name'" to the system OS 202.

At step 318, the IHS 100 copies the software package image 206 and other related data to the partition 220. Thereafter at step 320, the BMC firmware upgrade module 210 installs or deploys the software package image 206 as the new BMC software package 212 in the normal manner. At this point, the new software package image 206 has been deployed on the BMC 132, and the BMC 132 commences operating according to instructions of the new upgraded BMC software package 212.

Figure 4:
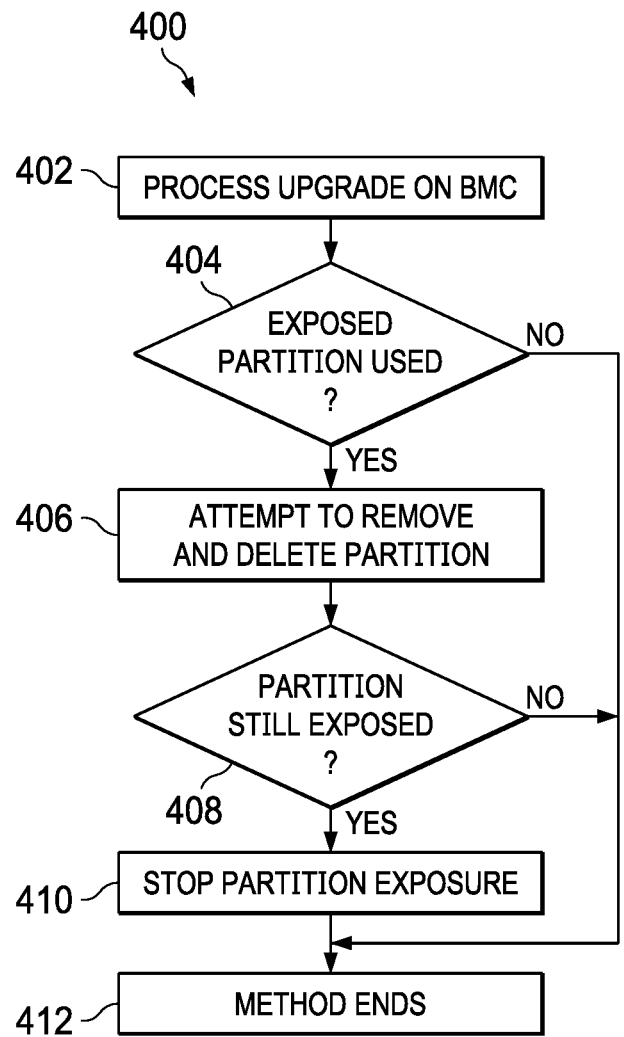
FIG. 4 illustrates an example partition un-exposing method that may be performed to ensure that the partition is no longer exposed to the system OS following upgrade of the software package of the BMC according to one embodiment of the present disclosure.

FIG. 4 illustrates an example partition un-exposing method 400 that may be performed to ensure that the partition 220 is no longer exposed to the system OS 202 following upgrade of the software package 212 of the BMC 132 according to one embodiment of the present disclosure. In one embodiment, the partition un-exposing method 400 may be performed in whole, or in part, by BMC firmware upgrade module 210 described herein above. Initially, the software package upgrade method 300 has been performed to upgrade the BMC software package 212 on the BMC 132. It may be important to note that the following method 400 may be performed whether or not the previously performed upgrade was successful or not.

At step 402, the BMC firmware upgrade module 210 processes the upgrade of the new BMC software package 212 on the BMC 132. In one embodiment, step 402 may perform certain features similar to those performed earlier at step 320 described herein above with reference to FIG. 3. When the upgrade is finished, the BMC firmware upgrade module 210 determine whether or not an exposed partition 220 was utilized in order to perform the upgrade procedure at step 404. For example, scenarios exist where the exposed partition 220 would not be necessary, such as when the upgrade only involves the manipulation of certain configuration parameters of the BMC 132, or when only a small segment of executable code is transferred to the BMC 132 such that those configuration parameters and/or relatively small executable code segments can be directly transmitted to the BMC 132 for their implementation without the use of any temporary partition 220. Nevertheless, if no partition 220 was created, processing continues at step 412 in which the process ends; otherwise, processing continues at step 406.

At step 406, the BMC firmware upgrade module 210 attempts to remove and delete the partition 220. For example, if the system OS 202 is a UNIX-based OS, the BMC firmware upgrade module 210 may issue certain commands that include the commands "rm 'software package image'" to remove any file in the partition 220, followed by "fdisk -d 'unique name'" to delete the partition 220 itself. Thereafter at step 408, the BMC firmware upgrade module 210 determines whether or not the partition is still exposed to the system OS 202. For example, the BMC firmware upgrade module 210 may communicate with the system OS 202 to determine whether the partition 220 is still exposed. Such scenarios may be exhibited under various conditions, such as when when the file system of the system OS 202 inadvertently leaves a file handle to one or more files temporarily stored in the partition 220 intact, and/or the system OS 202 has been spoofed into determining that a file in the partition 220 is continuing to execute a certain process. If the partition is still exposed to the system OS 202, processing continues at step 410; otherwise, processing continues at step 412 in which the method 400 ends.

At step 410, the BMC firmware upgrade module 210 stops the partition 220 exposure. For example, if the system OS is a UNIX-based OS, the BMC firmware upgrade module 210 may issue the command "chmod 000 'unique name'" such that all exposure of the partition 220 is halted. Nevertheless, it should be appreciated that other techniques for halting exposure of the partition 220 exist and are well known to those skilled in the art.

At step 412, the method ends. The aforedescribed method 400 may be performed each time a new BMC software package 212 is installed or deployed on the BMC 132. Nevertheless, when use of the partition un-exposing method 400 is no longer needed or desired, the method 400 ends.

Although FIGS. 3 and 4 each describe one example of a process that may be performed to upgrade a BMC 132 with a new or upgraded software package, the features of the disclosed processes may be embodied in other specific forms without deviating from the spirit and scope of the present disclosure. For example, certainly steps of the disclosed processes may be performed sequentially, or alternatively, they may be performed concurrently. As another example, the methods 300 and/or 400 may perform additional, fewer, or different operations than those operations as described in the present example. As yet another example, the steps of the processes described herein may be performed by a computing system other than the processing environment of BMC 132, such as by the processing environment provided by IHS 100 itself.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An information handling system (IHS) comprising:
   a Baseboard Management Controller (BMC) in communication with the IHS, the BMC including a baseboard processor and baseboard memory including instructions that, upon execution by the baseboard processor, cause the BMC to:
   create a partition having a unique name in response to a request from the IHS;
   transmit the unique name to the IHS;
   expose the created partition to the IHS, wherein a software upgrade package image is copied to the partition when the exposed partition becomes available to the IHS; and
   deploy the software package on the BMC, wherein the software package comprises executable instructions for operating the BMC.

2. The IHS of claim 1, wherein the instructions are further executed to generate a different unique name each time the partition is created.

3. The IHS of claim 1, wherein the instructions are further executed to generate the unique name using a random number generator.

4. The IHS of claim 1, wherein the instructions are further executed to create the partition in a memory of the BMC.

5. The IHS of claim 1, wherein the instructions are further executed to communicate with the IHS using a system bus of the IHS.

6. The IHS of claim 1, wherein the IHS is configured to identify the partition using the unique name received from the BMC.

7. The IHS of claim 1, wherein the IHS is configured to execute instructions included in a management update package (MUP) to copy the software package image to the partition, the MUP comprising the software package image.

8. The IHS of claim 1, wherein the IHS is configured to, when the partition becomes available, set read and write permissions to a process that copies the software package image to the partition, and read only to every other process.

9. The IHS of claim 1, wherein the instructions are further executed to un-expose the partition after the software package is deployed on the BMC.

10. The IHS of claim 8, wherein the instructions are further executed to un-expose the partition by:
    attempting to delete the partition; and
    when the partition is still exposed to the IHS, stopping the partition exposure.

11. The IHS of claim 1, wherein the software package comprises an upgraded version relative to the previously deployed software package of the BMC.

12. A method comprising:
creating, using instructions stored in at least one memory of a Baseboard Management Controller (BMC) and executed by at least one processor of the BMC, a partition having a unique name in response to a request from an information handling system (IHS);
transmitting, using the instructions, the unique name to the IHS;
exposing, using the instructions, the created partition to the IHS, wherein a software upgrade package image is copied to the partition when the exposed partition becomes available to the IHS; and
deploying, using the instructions, the software package on the BMC, wherein the software package comprises executable instructions for operating the BMC.

13. The method of claim 12, further comprising generating a different unique name each time the partition is created.

14. The method of claim 12, further comprising generating the unique name using a random number generator.

15. The method of claim 12, further comprising creating the partition in a memory of the BMC.

16. The method of claim 12, further comprising communicating with the IHS using a system bus of the IHS.

17. An information handling system (IHS) comprising:
a processor and memory including instructions that, upon execution by the processor, cause the IHS to:
transmit a request to generate a unique name to a Baseboard Management Controller (BMC);
receive the unique name from the BMC;
using the received unique name, transmit a request to create a partition with the unique name;
when the partition become available, copy a software upgrade package image to the partition; and
un-expose the partition after the software upgrade package is copied.

18. The IHS of claim 17, wherein the instructions are further executed to identify the partition using the unique name received from the BMC.

19. The IHS of claim 17, wherein the instructions are further executed to execute instructions included in a management update package (MUP) to copy the software package image to the partition, the MUP comprising the software package image.

20. The IHS of claim 17, wherein the instructions are further executed to, when the partition becomes available, set read and write permissions to a process that copies the software package image to the partition, and read only to every other process.

* * * * *